United States Patent [19]
Eppler et al.

[11] Patent Number: 5,783,506
[45] Date of Patent: Jul. 21, 1998

[54] CERAMIC GLAZE INCLUDING PEARLESCENT PIGMENT

[75] Inventors: Richard A. Eppler, Cheshire, Conn.; Jack S. Polonka, Peekskill, N.Y.

[73] Assignee: Engelhard Corporation, Iselin, N.J.

[21] Appl. No.: 797,670

[22] Filed: Jan. 31, 1997

[51] Int. Cl.$^6$ .................. C03C 8/14; C03C 8/16
[52] U.S. Cl. .................. 501/14; 501/17; 501/18; 501/20; 106/417; 106/418; 106/DIG. 1; 427/193; 427/279; 427/376.2; 428/426
[58] Field of Search .................. 501/14, 17, 18, 501/20; 106/DIG. 3, 417, 418; 427/193, 279, 376.2; 428/426

[56] References Cited

U.S. PATENT DOCUMENTS

| | | | |
|---|---|---|---|
| 4,353,991 | 10/1982 | Van Ness et al. | 501/17 |
| 4,720,438 | 1/1988 | Watanabe et al. | 428/697 |
| 5,009,711 | 4/1991 | Emmert et al. | 106/415 |
| 5,022,923 | 6/1991 | Rau et al. | 106/415 |
| 5,106,419 | 4/1992 | Hechler et al. | 106/418 |
| 5,366,763 | 11/1994 | McDaniel | 427/193 |

*Primary Examiner*—Karl Group
*Attorney, Agent, or Firm*—Ostrolenk, Faber, Gerb & Soffen, LLP

[57] ABSTRACT

The present invention relates to a ceramic coating composition contains frit, suspending agent, binder, mica and pearlescent pigment and has a viscosity of about 10 to 50 second as measured by a Zahn cup with orifice diameter of 0.108 inch.

20 Claims, No Drawings

CERAMIC GLAZE INCLUDING PEARLESCENT PIGMENT

BACKGROUND OF THE INVENTION

Pearlescent or nacreous pigments based on micaceous substrates which have been coated with a metal oxide layer are well known. These pigments exhibit pearl-like luster as a result of reflection and refraction of light. Depending on the thickness of the metal oxide layer, they can also exhibit interference color effects. Commercially, the pearlescent pigments encountered most often are the titanium dioxide-coated mica pearlescent pigments and the iron oxide-coated mica pearlescent pigments.

The pearlescent pigments have been formulated for a wide variety of uses. Thus they have been used in automotive paints, plastics, cosmetics and the like. They have also been incorporated into various vitreous compositions. In this connection, see for example, U.S. Pat. Nos. 4,353,991; 5,009,711; 5,022,923; 5,106,419; and 5,366,763; Canadian Patent 1,277,456; EPO 307 3771 and EPO 446 689. When applied to metal substrates, the compositions are generally called enamels and when applied to ceramics, they are generally called glazes.

The use of pearlescent pigments in vitreous coating compositions has to date been limited. The coating composition is applied to the substrate and then heated or fired at a temperature sufficient to cause the coating components to melt. When cooled, a thin coating of glass is formed on the substrate. Unfortunately, the pearlescent pigments in these vitreous coating compositions dissolve during the firing process. As a result, the very purpose for incorporating the pearlescent pigments into the composition in the first instance, namely the aesthetic appearance of the fired object, is not achieved.

Attempts in the prior art to overcome this problem have not been satisfactory. Ferro in U.S. Pat. No. 4,353,991 incorporated pearlescent pigments into predominantly lead and/or cadmium-containing glass frits but the resulting glaze could only be fired within a limited temperature range of about 500° to 700° C. Conventional glazes are fired at temperatures of up to 1000° C. or higher to obtain the desired appearance.

McDaniel U.S. Pat. No. 5,366,763 addresses the problem by applying pearlescent pigments onto vitreous ceramic surfaces without the use of a frit. However this approach also limits the application to low temperatures to the glass substrate composition (about 500° to 700° C.) in order to allow the pigment to sink into and fuse with the vitreous coating. In addition, this approach does not impart a vitreous surface to an uncoated article.

An alternative approach is described in U.S. Pat. Nos. 5,022,923 and 5,106,419 in which the firing temperature of a pigment-containing glaze is increased up to 1000° C. by using pearlescent pigments which have been post-treated with aluminum oxide, tin oxide or cerium oxide. These specially treated pigments are more expensive and while more stable, their stability is less than ideal. In addition, the post-treatment interferes with the color quality of the pigment and increases the cost of processing the pigment.

As will be appreciated from the foregoing description, there still remains a need for the ability to incorporate a pearlescent pigment into a conventional vitreous coating composition which will allow the desired appearance effects to be achieved using conventional firing techniques and parameters. It is accordingly the object of the present invention to provide such a method and coating composition. This and other objects of the invention will become apparent to those of ordinary skill in the art from the detailed description below.

SUMMARY OF THE INVENTION

This invention relates to a vitreous coating composition and its use. More particularly, the invention relates to a vitreous coating composition comprising frit, suspending agent, binder, mica and pearlescent pigment which has a particular viscosity. The coating composition can be applied to various substrates including metals and ceramics and fired using conventional parameters. In a preferred embodiment, a fast firing profile is employed.

DESCRIPTION OF THE INVENTION

In accordance with the present invention, a vitreous coating composition comprises frit, suspending agent, binder, mica and pearlescent pigment and has a viscosity of about 10 to 50 seconds as measured by a Zahn cup with an orifice diameter of 0.108 inches (2.74 mm). With this formulation, a pigment bearing composition can be fired to higher temperatures than in the prior art, i.e. greater than 1000° C., with a minimal amount of dissolution and without the use of post-treated pigments. The coating composition of the invention formulation takes advantage of stratified sedimentation of the pigment on the coating surface ("leafing") and also on the use of uncoated mica. The concentration of a pigment close to the surface as a result of stratified sedimentation inhibits or slows down the dissolution process. The uncoated mica dissolves preferentially with respect to the pigment in the coating composition at high temperatures thereby also minimizing dissolution of the pigment.

An increased concentration of pigment and uncoated mica at or close to the glaze surface can also be obtained by applying to such surface a thin coating using a formulation which has a higher pigment/uncoated mica to frit ratio (or no frit at all). Such an application is desired if specific small areas need to be covered by a pigmented glaze such as in screen printing.

Vitreous coating compositions containing frit, suspending agent and binder are conventional. Any of the known materials and combinations thereof can be used in the practice of the present invention. While a lead containing glass frit can be used, the leadless frits are generally preferred because they are less hazardous. The binders can be either inorganic or organic materials such as cellulose ethers, starches or gums as long as they provide the binder function of holding the ceramic coating composition formulation to the object before the firing process. The suspending agents that can be employed include both natural clays, synthetic clays and fumed silicas. The appropriate agent is selected based on the other ingredients in the composition so that the pigment or uncoated mica undergo stratification as the suspension is applied. If too strong a suspending agent is used, the stratified sedimentation will be hindered or will not occur at all and this results in dissolution of the pearlescent pigment and a product with little or no luster. Agents appropriate to the particular formulation can be quickly identified experimentally, if necessary. The suspending agent should be selected carefully because an incorrect suspending agent in the firing coating composition can detrimentally effect the final appearance of the coating or the chemistry of the glass frit, such as lowering the softening point of the frit or increasing the dissolution of the pearlescent pigment.

To the conventional formulation of frit, suspending agent and binder is added both the pearlescent pigment and mica. The pearlescent pigments used in the present invention are any of the known titanium dioxide-coated or iron oxide-coated mica pearlescent pigments. The iron oxide-coated pigments are preferred because they have a greater ability to resist being attacked by the glass frits which are currently commercially available. These iron oxide-coated mica products change color from bronze to a dark reddish blue appearance depending on the amount of iron oxide-coated on the mica and have an average size ranging from about 4 μm to 75 μm. The titanium dioxide-coated mica pigments include the white pearl titanium oxide-coated micas as well as the interference pigments in which the thickness of the titanium dioxide layer on the mica produces interference colors. The pigment is used in an amount to provide the desired appearance and this will generally be about 3 to 20% based on the total weight of the coating composition and preferably about 5 to 10%.

The mica used in the present formulations can be selected from any known mica. These include muscovite, phlogopite and biotite as well as any of the synthetic micas available such as the fluorosilicates. The amount of mica is that sufficient for it to perform its function as a sacrificial entity while providing the formulation with the appropriate rheological attributes. Thus once the amounts of frit, suspending agent, binder and pearlescent pigment are established, the mica is used in an amount to give the desired viscosity to the coating composition. In most instances, the amount of mica will fall in the range of about 1 to 10% based on the weight of the total coating composition and preferably about 2 to 5%.

With respect to rheological control of the coating composition, the viscosity has to be within a specific range in order to have the optimal condition needed for the coating suspension. There are two reasons for this requirement. First, the pearlescent pigment needs to be aligned properly, through lamellar fluid flow, when the coating composition suspension is applied to the surface being coated. Secondly, the suspension needs to undergo stratified sedimentation. If the viscosity is outside of the range, the lamellar fluid flow and stratified sedimentation of the applied coating composition suspension will be hindered. The viscosity of the suspension should be in a range of about 10 to 50 seconds as determined by a Zahn cup with an orifice diameter of 0.108 inches and preferably about 20 to 35 seconds. When measured using a Brookfield viscometer, the viscosity is about 50 to 110 cps and preferably about 70 to 100 cps.

The vitreous coating composition is applied to the substrate, for example a metal substrate or a ceramic substrate, in the conventional fashion and can be fired using conventional profiles. In a preferred embodiment, the coating composition is fast fired to further prevent excessive dissolution of the pigment. Such a fast firing process, the coating composition is heated rapidly to the selected peak temperature, held there for a short period of time and then cooled down quickly. Preferably the heating and cooling times to and from the peak temperature are about 30 to 360 minutes and most preferably about 60 to 240 minutes. Preferably the holding period at peak temperature is about 0 to 10 minutes and most preferably about 0 to 5 minutes.

In order to further illustrate the present invention, various examples are set forth below. In these examples, as throughout this specification and claims, all parts and percentages are by weight and all temperatures are in degrees centigrade unless otherwise indicated.

EXAMPLE 1—CERAMIC GLAZE WITH BRONZE APPEARANCE

A glaze suspension was prepared by mixing the following two premixes together. Premix A was a blend of 90.5 gm of a leadless boroaluminum silicate frit (available from Bayer Inc. as P-4N57), 0.5 gm of bentonite and 0.5 gm of carboxymethyl cellulose (available from Aqualon).

Premix B was prepared by thoroughly blending 6.0 gm of an iron oxide-coated mica having a bronze appearance which contains about 37% iron oxide and 63% muscovite mica and has an average platelet size of about 18 μm (available from The Mearl Corporation as Mearlin Super Bronze 925OZ), 2.25 gm of muscovite mica and 0.25 gm of tetrasodium pyrophosphate.

Premix A and Premix B were then mixed with 100 ml of water and the relative amounts adjusted to a Zahn viscosity number of 25.0 to 25.5 sec. This suspension was then applied to a 2 inch by 2 inch (50.8 mm square) matte white tile and fired at 1005° C. for a short period of time. The fired glaze had a bronze appearance with good gloss and luster.

EXAMPLE 2—CERAMIC GLAZE WITH A RUSSET APPEARANCE

Premix A was prepared by mixing 90.5 gm of the Bayer glass frit P-4N57, 0.5 gm of fumed silica (available as Cab-o-Sil from Cabot Corp.) and 1.0 gm of Veegum (a synthetic clay available from R. T. Vanderbilt Co.)

Premix B was prepared by blending 8.0 gm of an iron oxide-coated mica having a reddish (russet) appearance which contains about 43% iron oxide and 57% muscovite mica having a medium platelet size of about 18 μm (available from The Mearl Corporation as Mearlin Super Russet 945OZ), 2.25 gm of muscovite mica and 0.25 gm of tetrasodium pyrophosphate. Premixes A and B were suspended in 100 ml of water and the amounts adjusted to a Zahn viscosity number of 29.5 to 30 sec. This suspension was applied to a white tile and fired at 1010° C., yielding a tile with a lustrous russet appearance.

EXAMPLE 3—CERAMIC GLAZE WITH A COPPER BRONZE APPEARANCE

Premix A was prepared by blending 90.5 gm of the Miles leadless glass frit, 0.5 gm of Cab-o-Sil, and 0.5 gm of carboxymethyl cellulose. Premix B was prepared by mixing 6.5 gm of an iron oxide-coated mica which consists of 51% iron oxide and 49% muscovite mica having a median particle size of about 12 μm (available from The Mearl Corporation as Mearlin Fine Copper 935OV), 2.25 gm of muscovite mica, and 0.25 gm of tetrasodium pyrophosphate. These two premixes were suspended in 100 ml of water and the viscosity adjusted to 27.0 to 27.5 seconds. The suspension was applied to a tile and fired at 1005° C. yielding a copper colored tile with good luster.

EXAMPLE 4—CERAMIC GLAZE WITH BLUISH RED APPEARANCE

Premix A was prepared in the same manner as described in Example 3. Premix B was prepared by mixing 8.0 gm of an iron oxide-coated mica having a bluish red appearance consisting of 53% iron oxide and 47% muscovite mica having a medium particle size of about 18 μm (available from The Mearl Corporation as Mearlin Super Blue Russet 965OZ), 2.25 gm of muscovite mica and 0.25 gm of tetrasodium pyrophosphate. Premix A and B were suspended in 100 ml of water and the viscosity adjusted to 29.5 to 30.0 sec. The suspension was applied to a tile and fired at 1025° C. resulting in a lustrous, bluish red glaze.

EXAMPLE 5—CERAMIC GLAZE WITH A BRONZE APPEARANCE

Premix A was prepared as in Example 3 and Premix B was prepared as in Example 1. These two premixes were suspended together in 100 ml of water and the viscosity adjusted to a Zahn number of 25.0 to 25.5 seconds. This suspension was then applied to a matte white tile and fired at 1005° C. for a short time. The bronze colored glaze had good gloss and luster.

EXAMPLE 6—CERAMIC GLAZE WITH A GOLD APPEARANCE

Premix A and B are prepared as in Example 5 except that titanium oxide-coated mica was used in place of the iron oxide coated mica. The titanium oxide-coated mica has a gold appearance and contains 35% titanium oxide and 65% muscovite mica. All other procedures are the same as in Example 5 with the exception of the firing temperature. The coated white tile was fired at 900° C. for a short period of time. The result was a golden lustrous glaze.

EXAMPLE 7—FAST FIRE SAMPLE WITH TIME DATA

Three sets of coated white matte were prepared using the procedure in Example 5. Each set was fired at 1005° C. with a 0 minute, 2 minutes and ~10 minutes dwell time at peak temperature. The set fired with a 0 minute dwell time had a bronze color with good gloss and luster while the 2 minute dwell time showed a slight red hue in the color. For the set fired with a ~10 minute dwell time, there was little to no luster and the bronze color was gone.

EXAMPLE 8—SCREEN PRINTING WITH A BRONZE APPEARANCE

Premix B, prepared in the same fashion as in Example 1, was mixed into a suspension containing 0 to 45 g of Bayer P-4N57 frit and 7 to 33 gm of screen printing medium. This mixture was applied, via a screen, onto a matte white tile and fired at 1030° C. for a short period of time. The bronze colored glaze pattern had good gloss and color.

Various changes and modifications can be made in the process and product of this invention without departing from the spirit and scope thereof. The various embodiments which were set forth herein were for the purpose of illustrating the invention and were not intended to limit it.

What is claimed is:

1. A vitreous coating composition comprising frit, suspending agent, binder, mica and pearlescent pigment, said composition having a viscosity of about 10 to 50 seconds as measured by a Zahn cup with an orifice diameter of 0.108 inches.

2. The coating composition of claim 1, in which the viscosity is about 20 to 35 seconds.

3. The coating composition of claim 1, in which the frit is leadless.

4. The coating composition of claim 3, in which the pearlescent pigment is an iron oxide-coated mica.

5. The coating composition of claim 3, in which the pearlescent pigment is titanium dioxide-coated mica.

6. The coating composition of claim 1, in which the pearlescent pigment is titanium dioxide-coated mica.

7. The coating composition of claim 1, in which the pearlescent pigment is an iron oxide-coated mica.

8. A fired coating composition of claim 7.

9. A fired coating composition of claim 6.

10. A fired coating composition of claim 3.

11. A fired coating composition of claim 1.

12. A coated substrate comprising a substrate body having a fired coating composition of claim 1 on at least a part of a surface thereof.

13. A coated substrate comprising a substrate body having a fired coating composition of claim 3 on at least a part of a surface thereof.

14. A coated substrate comprising a substrate body having a fired coating composition of claim 6 on at least a part of a surface thereof.

15. A coated substrate comprising a substrate body having a fired coating composition of claim 7 on at least a part of a surface thereof.

16. A method of coating a substrate body comprising coating at least a portion of a surface of the body with a vitreous coating composition comprising frit, suspending agent, binder, mica and pearlescent pigment which has a viscosity of about 10 to 50 seconds as measured by a Zahn cup with an orifice diameter of 0.108 inches, and firing said coated body.

17. The method of claim 16, in which the amount of time that the coated body is heated to reach a peak firing temperature is less than about 5 minutes.

18. The method of claim 16, wherein the viscosity is about 20 to 35 seconds.

19. The method of claim 16, wherein the pearlescent pigment is titanium dioxide-coated mica.

20. The method of claim 16, wherein the pearlescent pigment is an iron oxide-coated mica.

* * * * *